United States Patent
Kubo et al.

[19]

[11] Patent Number: 5,963,520
[45] Date of Patent: Oct. 5, 1999

[54] METHOD AND APPARATUS FOR HIGH SPEED DATA RECOVERY FROM CD-ROMS OR LIKE DISKS OR VARYING QUALITIES

[75] Inventors: Mitsumasa Kubo, Tachikawa; Yuichi Sakamoto, Musashino; Masashi Tanaka, Tokorozawa, all of Japan

[73] Assignee: Teac Corporation, Tokyo, Japan

[21] Appl. No.: 08/884,876

[22] Filed: Jun. 30, 1997

[30] Foreign Application Priority Data

Jul. 10, 1996 [JP] Japan ..................................... 8-199717
Oct. 9, 1996 [JP] Japan ..................................... 8-287385

[51] Int. Cl.[6] ................................. G11B 3/90; G11B 7/00
[52] U.S. Cl. ............................ 369/54; 369/50; 369/44.35
[58] Field of Search ............................. 369/44.27, 44.29, 369/44.32, 44.35, 44.36, 53, 54, 58, 50

[56] References Cited

U.S. PATENT DOCUMENTS 5,642,342  6/1997  Murata ...................................... 369/50
5,745,458  4/1998  Oliver et al. .............................. 369/54

*Primary Examiner*—Paul W. Huber
*Attorney, Agent, or Firm*—Woodcock Washburn Kurtz Mackiewicz & Norris LLP

[57] ABSTRACT

CD-ROMS of more or less poor quality, such as those having eccentric center holes or uneven weight distributions circumferentially, tend to overload tracking and focusing servos and hence to invite read errors and retries. Each CD-ROM on being loaded into a CD-ROM drive is therefore checked as to its quality preparatory to reading. Either or both of the servos may fail to keep the read beam under control if the disk is not of good quality. Such unlocking of either or both servos is detected in terms of the number of transducer output pulses, the magnitude of transducer output voltage, or the number of read errors, during a complete disk revolution. Disk quality is first checked at four times the standard audio CD speed, then at eight times that speed, and finally at twelve times that speed. Disks of poor quality are read at two times the standard audio CD speed, those of below-average quality at four times that speed, those of above-average quality at eight times that speed, and those of good quality at twelve times that speed.

14 Claims, 8 Drawing Sheets

METHOD AND APPARATUS FOR HIGH SPEED DATA RECOVERY FROM CD-ROMS OR LIKE DISKS OR VARYING QUALITIES

BACKGROUND OF THE INVENTION

This invention relates to the recovery of data from rotating data storage disks such as, typically, compact disks (CDs) used as read-only memories (ROMs) in computer systems. More specifically, the invention concerns how to determine optimum speeds of rotation for CD-ROMs or like data storage disks of varying physical qualities for error-free, and hence speedier, reading thereof.

Although originally developed for consumer audio reproduction in place of phonograph records, CDs have now found widespread commercial acceptance as compact, high-speed, large-capacity ROMs for computers. The only difference of CD-ROMs from audio CDs is that the CD-ROMs are driven at speeds up to twelve times as high as the standard audio CD speed (1.2–1.4 meters per second).

There have been problems left unsolved in use of CD-ROMs with high-speed CD-ROM drives in computer systems. CD-ROMs are presently being made under the same design specifications and manufacturing standards as low-speed audio CDs. Inevitably, therefore, a substantial percentage of CD-ROMs on the market are not of truly satisfactory quality for use as high-speed computer data storage media. Some have their center holes cut eccentrically; others have an uneven weight distribution circumferentially. When driven at a speed as high as, say, 12 times the standard audio CD speed, such eccentric disks are very likely to overload the tracking servo of the CD-ROM drive whereby the radial position of the beam spot on the disk is maintained in alignment with the spiral data track. The overloading of the tracking servo may result in the overheating of the voice-coil actuator for tracking control, in the degradation of its performance and, in the worst case, in the burning of the actuator coil.

Such low-grade disks are also very easy to wobble when driven at high speed. The disk wobbling may go so far as to overload the beam focusing servo of the CD-ROM drive, again resulting in the overheating of the focusing actuator of voice-coil construction, in the degradation of its performance and, in the worst case, in the burning of the focusing actuator coil. The malfunctioning of both tracking and focusing servos is very undesirable because of ensuing read errors and retries, which run counter to the objective of high speed data recovery for which CD-ROMs are intended.

The wobbling of low grade disks can give rise to additional inconveniences. A wobbling disk may cause vibration of the complete CD-ROM drive and, in consequence, of the hard disk drive (HDD) in particular which is currently being preferentially built into the computer system along with the CD-ROM drive. The vibration of the HDD is even more undesirable because it may invite both read and write errors, to the detriment of the reliability of the complete computer system. Even if not so excessive as to cause read and write errors, the vibration of the CD-ROM drive certainly gives a shoddy image to the user or to prospective buyers.

It might be contemplated that all such troubles and inconveniences would be avoidable if only high quality CD-ROMs, altogether free from the physical defects pointed out earlier, were used. CD-ROM drive manufacturers cannot, and should not, expect their products to be used only that way, since in the current state of affairs the existence of poor quality CD-ROMs must be more or less taken for granted.

SUMMARY OF THE INVENTION

The present invention has it as an object to enable speedy data recovery from CD-ROMs or other data storage disks of low quality without any such troubles and inconveniences as have been encountered here-tofore.

Another object of the invention is to recover data from disks of varying physical qualities at the highest possible speed suiting each particular disk without causing read errors or retries.

Briefly summarized in one aspect thereof, the invention provides what may be termed a disk check method, suitable for implementation in an apparatus for data recovery from rotating data storage disks of varying physical qualities, the apparatus having a transducer for reading a disk by irradiating the same with a beam of light, a tracking servo for holding the beam spot in alignment with a data track on the disk surface, and a focusing servo for holding the beam focused on the disk surface.

The disk check method is such that a data storage disk is first rotated at a first predetermined speed, with both tracking servo and focusing servo in operation, preparatory to data recovery therefrom. If at least either of the tracking servo and the focusing servo is then found malfunctioning because of some physical defect of the disk, this disk is of poor quality and so is read at a second predetermined speed which is less than the first.

On the other hand, if said at least either of the tracking servo and the focusing servo is found functioning normally, then the disk is not of poor quality, fit for reading at not less than the first predetermined speed.

Preferably, if said at least either of the tracking servo and the focusing servo is found functioning normally during disk rotation at the first predetermined speed, disk quality is rechecked by rotating the disk at a third predetermined speed which is more than the first predetermined speed. The disk is read at the first predetermined speed if said at least either of the tracking servo and the focusing servo is found malfunctioning this time, and at not less than the third predetermined speed if said at least either of the tracking servo and the focusing servo is found functioning normally.

Still more preferably, if said at least either of the tracking servo and the focusing servo is found functioning normally during disk rotation at the third predetermined speed, disk quality is further rechecked by rotating the disk at a fourth predetermined speed which is more than the third predetermined speed. The disk is read at the third predetermined speed if said at least either of the tracking servo and the focusing servo is found malfunctioning now, and at the fourth predetermined speed if said at least either of the tracking servo and the focusing servo is found functioning normally.

Thus, in one aspect of the invention, each data storage disk is checked and classified into either of the four quality categories of "poor," "below average," "above average," and "good." Disks of poor quality are read at two times the standard audio CD speed, those of below average quality at four times that speed, those of above average quality at eight times that speed, and those of good quality at twelve times that speed, in a preferred embodiment of the invention.

Each disk may be checked at progressively higher speeds, for example, first at four, then at eight, and finally at twelve, times the standard audio CD speed. Check operations can be cut short at either the first or the second speed if either or both of the tracking servo and the focusing servo are then found malfunctioning. Shorter periods of time are therefore needed for checking the successive loaded disks than if they were required to undergo the complete process involving disk rotation at the three different speeds.

Whether either or both of the tracking and the focusing servos are functioning normally or not is ascertainable in several ways. The functioning of the tracking servo in particular is preferentially examined in terms of the number of transducer output pulses per unit length of time, and the functioning of the focusing servo in terms of the magnitude of the transducer output voltage per unit length of time. Alternatively, the number of read errors per unit length of time can also be relied upon for the determination of whether at least either of the tracking and the focusing servos is functioning or not. Reliance on data errors is inferior to that on transducer output pulses or on transducer output voltage magnitude in quickness with which results are obtained, but definitely superior thereto in correctness.

It might be feared that read errors were averted at the sacrifice of disk speed. Such fears are unjustified. Experiment has proved that the errorless reading of poor, below average, and above average quality disks at the reduced speeds demands far less periods of time than high speed reading of such disks which necessarily involves read errors and retries. The advantages of such reduced speed data recovery from disks of other than good quality will be even better appreciated by taking into consideration all the aforementioned difficulties accruing from the high speed reading of these disks.

According to a further feature of the present invention, the read speed that has been determined as above for each disk loaded into the apparatus is held until that disk is unloaded therefrom. Therefore, no matter how many times the disk is set into and out of rotation, the disk will be read at the same appropriate speed as along as it stays loaded.

The reduced speed driving of disks of other than good quality brings about an additional advantage of less vibration. In a computer system incorporating both CD-ROM drive and HDD the less vibration of the CD-ROM drive is very important because of the correspondingly less vibration of the HDD, which will therefore suffer less read and write errors.

The invention also concerns an apparatus for use in the practice of the disk check method summarized above. The method requires mostly only preexisting parts of an apparatus for reading a CD-ROM or like data storage disk, except perhaps a system controller constructed and programmed for carrying out the method.

The above and other objects, features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENT

Figure 1:
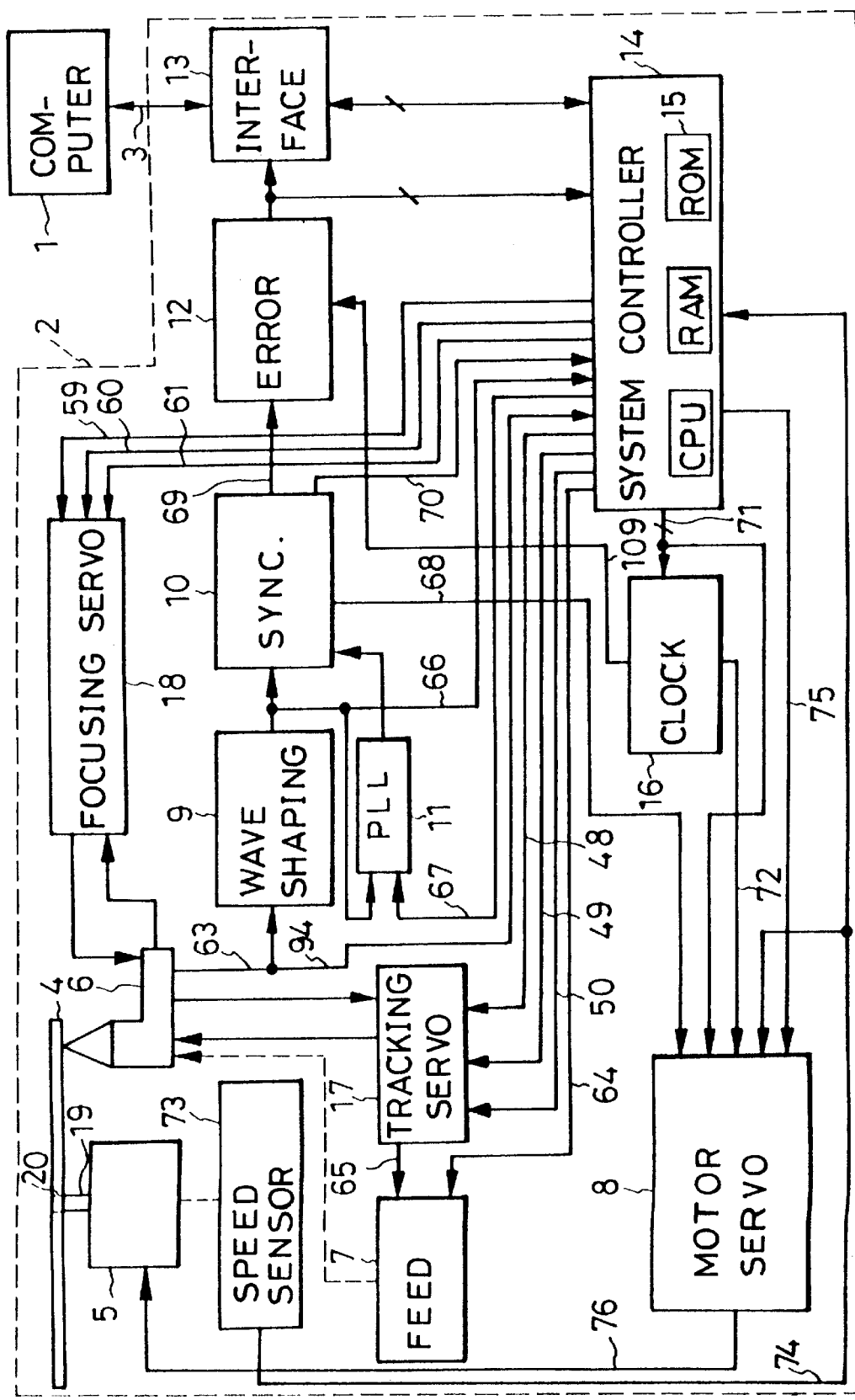
FIG. 1 is a block diagram of an example of CD-ROM drive constructed in accordance with the novel concepts of this invention, the CD-ROM drive being shown together with a computer with which it is incorporated.

The present invention is believed to be best embodied in the computer system diagramed in FIG. 1, which shows a computer 1 connected to a CD-ROM drive 2 by way of a bus 3. The CD-ROM drive 2 is shown loaded with a CD-ROM or optical data storage disk (hereinafter referred to simply as the disk) 4, which is disposed in position within the CD-ROM drive by receiving in its center hole 20 a drive spindle 19 shown as an armature shaft of an electric disk drive motor 5.

Other primary components of the CD-ROM drive 2 include an opto-electric transducer or pickup 6, a transducer feed means 7, a disk drive motor servo circuit 8, a wave shaping circuit 9, a synchronization detector and demodulator circuit 10, a phase locked loop (PLL) circuit 11, an error detector and corrector circuit 12, an interface circuit 13, a system controller 14 in the form of a microprocessor with a read-only memory (ROM) 15, a variable rate clock 16, a tracking servo circuit 17, and a focusing servo circuit 18. It is understood that the CD-ROM drive 2 is capable of data recovery at various speeds up to 12 times the standard audio CD speed in this particular embodiment.

Figure 2:
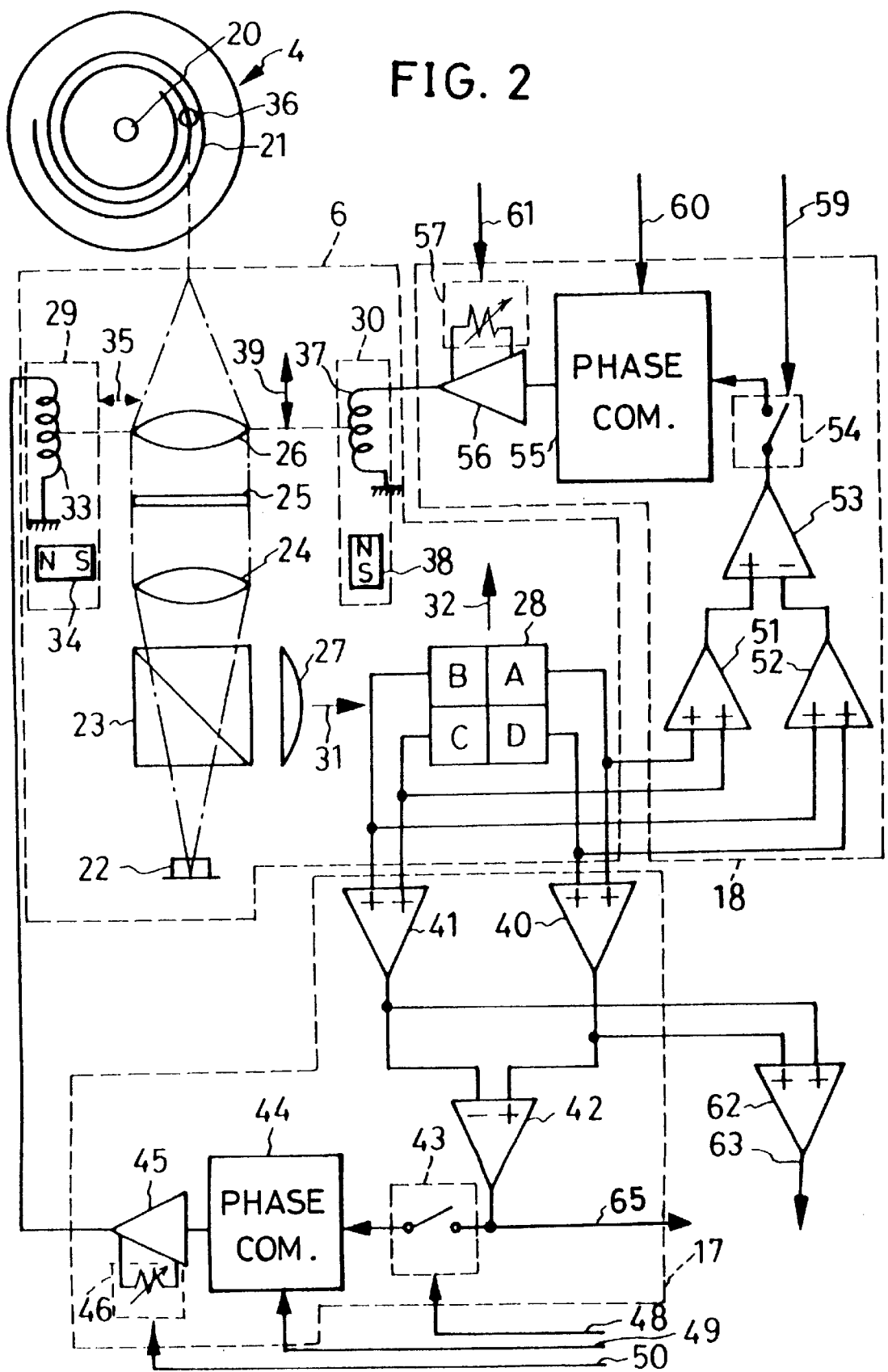
FIG. 2 is a schematic electrical diagram showing in more detail the transducer, tracking servo circuit, and focusing servo circuit of the FIG. 1 CD-ROM drive.

As depicted diagrammatically in FIG. 2, the disk 4 can be of the standard CD-ROM design having data prerecorded thereon in the form of optically detectable pits along a multiturn spiral track 21 centered about the hole 20. The data is conventionally prerecorded by being divided into a multiplicity of blocks each consisting of 2352 bytes, one byte being eight bits. Each data block is read in $1/75$ second when the disk is read at the standard audio CD speed. In CD-ROMs, as in audio CDs, data is recorded, and read, at constant linear velocity (CLV), rather than at constant angular velocity (CAV), so that the angular velocity of the disk 4 is decreased as the transducer 6 scans the disk track 21 radially outwardly.

As shown in detail also in FIG. 2, the transducer 6 is of prior art design having a light source such as a diode laser 22, a beam splitter 23, a collimator lens 24 for providing parallel rays of light, a quarter wavelength plate 25, an objective lens 26, a semicylindrical lens 27 disposed on the path of the light beam that has been reflected back from the disk 4 and subsequently separated from the incident beam by the beam splitter 23, a quadruple photodetector 28, a tracking actuator 29, and a focusing actuator 30. The tracking actuator 29 and the focusing actuator 30 constitutes the final control elements of the tracking and the focusing servos, respectively, which are yet to be detailed.

Converged by the objective 26, the beam of light from the laser 22 will hit the surface of the disk 4. The unmodulated beam on hitting the disk surface will be modulated by the pattern of pits representative of data, and the thus modulated beam will be directed by the beam splitter 23 into the photodetector 28 via the semicylindrical lens 27. The modulated beam incident to the photodetector 28 is indicated by the arrow designated 31.

Capable of translating the incident light into electric signals, the photodetector 28 is shown to have a closely packed array of four sections designated A, B, C and D, not only for data recovery but for both focusing and tracking controls, too. The photodetector sections A and B, as well as the sections C and D, are so divided along a line extending essentially in the tangential direction of the disk track 21, as indicated by the arrow 32.

Contrary to the showing of FIG. 2, the familiar three spots method could be employed for data recovery and focusing and tracking controls. The beam from the laser 22 must be split into a primary beam and two auxiliary beams according to this prior art method. The primary beam is used for both data recovery and focusing, and the two auxiliary beams for tracking only. The photodetector 28 needs modification in this case to include two additional sections to be irradiated by the two tracking beams.

The tracking actuator 29 takes the form of a familiar voice coil device comprising a moving coil 33 coupled to the objective 26, and a permanent magnet 34. In response to bidirectional current flow therethrough, the moving coil 33 will move back and forth in the field of the magnet 34 parallel to the disk surface, as indicated by the double headed arrow 35. The objective 26 will move with the moving coil 33 radially of the disk 4 for maintaining the beam spot 36 in exact alignment with the spiral track 21 on the disk 4.

The tracking actuator 29 serves the additional purpose of jumping the beam spot to a desired track position during seek operations. Such spot jumping will take place as a jumping signal is applied from the system controller 14 to the tracking servo circuit 17.

Another possible method of tracking control is to provide a mirror on the path of the beam. Instead of moving the objective 26, this mirror may be pivoted back and forth so as to keep the beam spot aligned with the disk track.

The focusing actuator 30 is also shown as comprising a moving coil 37 and a permanent magnet 38. Coupled to the objective 26, the moving coil 37 is movable in the field of a permanent magnet 38. The objective 26 will move back and forth perpendicular to the disk surface, as indicated by the double headed arrow 39, in response to bidirectional current flow through the moving coil 37. The beam will thus be kept focused on the disk surface.

As shown also in FIG. 2, the noted four sections A-D of the photodetector 28 are all connected to the tracking servo circuit 17 and thence to the moving coil 33 of the tracking actuator 29 on one hand and, on the other hand, to the focusing servo circuit 18 and thence to the moving coil 37 of the focusing actuator 30. The tracking servo circuit 17 will first be described in detail, followed by the description of the focusing servo circuit 18.

The tracking servo circuit 17 comprises two adders 40 and 41, a subtracter 42, an on-off switch 43, a phase compensator circuit 44, a drive amplifier 45, and a gain select means 46. The adder 40 adds together the outputs from the photodetector sections A and D, and the adder 41 the outputs from the other photodetector sections B and C The subtracter 42 subtracts the output from the adder 41 from the output from the adder 40. The resulting output from the subtracter 38 is a tracking signal, which is applied to the moving coil 33 of the tracking actuator 29 via the on-off switch 43, phase compensator circuit 44, and drive amplifier 45, thereby causing the objective 26 to move parallel to the disk surface to keep the beam spot 36 in alignment with the disk track 21.

The above described method of obtaining the tracking signal from the four photodetector sections A–D is itself not new in the art but has been known as a differential phase detection method. The switch 43 for on-off control of the tracking servo is under the control of a signal supplied from the system controller 14, FIG. 1, over a line 48. When the tracking servo is cut open will become apparent from the subsequent discussion of the inventive method.

The phase compensator circuit 44 is a known circuit comprising both a low pass filter and a high pass filter, with the filter constants changed by a signal fed from the system controller 14 over a line 49. Since the disk 4 is driven at CLV, with the disk speed changing with the radial position of the transducer on the disk, it is conventional in the art to vary the constants of the phase compensator circuit 44 accordingly.

Notwithstanding the showing of FIG. 2 the phase compensator circuit 44 could be connected between subtracter 42 and switch 43. Also, this figure does not show the automatic gain control circuit and the low pass filter which are customarily connected between subtracter 42 and phase compensator 44, because of their impertinence to the present invention.

It is to be noted that the tracking servo circuit 17 includes the gain select means 46, shown as a variable resistor. The gain of this tracking servo is therefore variable under the control of a signal fed from the system controller 14 over a line 50. The system controller varies the tracking servo gain according to whether the disk is driven at the standard audio CD speed or at two, four, eight or twelve times that speed. The method of this invention also requires changes in tracking servo gain, as will become apparent presently.

The focusing servo circuit 18 comprises two adders 51 and 52, a subtracter 53, an on-off switch 54, a phase compensator circuit 55, a drive amplifier 56, and a gain select means 57. The adder 51 adds together the outputs from the photodetector sections A and C, and the adder 52 the outputs from the other photodetector sections B and D. The subtracter 53 subtracts the output from the adder 52 from the output from the adder 51. The resulting output from the subtracter 53 is a focusing signal, which is applied to the moving coil 37 of the focusing actuator 30 via the on-off switch 54, phase compensator circuit 55, and drive amplifier 56, thereby causing the objective 26 to move toward and away from the disk 4 in order to hold the beam focused on the disk surface.

The above described method of obtaining the focusing signal from the four photodetector sections A–D is itself not new in the art but has been known as an astigmatic method. The switch 54 for on-off control of the focusing servo is under the control of a signal supplied from the system controller 14, FIG. 1, over a line 59. The focusing servo switch 54 will be opened along with the tracking servo switch 43 during the execution of the method of this invention.

Like its tracking servo counterpart 44, the phase compensator circuit 55 of the focusing servo circuit 18 is a known circuit comprising both a low pass filter and a high pass filter, with the filter constants changed by a signal fed from the system controller 14 over a line 60. This phase compensator circuit 55 could also be connected between subtracter 53 and switch 54 instead of on the output side of the switch 54. The standard automatic gain control circuit and the low pass filter are omitted from the focusing servo circuit 18, too, because of their impertinence.

It will be noted that the focusing servo circuit 18 includes the gain select means 57, too. The gain of the focusing servo is therefore variable under the control of a signal fed from the system controller 14 over a line 61. The system controller varies the focusing servo gain according to whether the disk is driven at the standard audio CD speed or at two, four, eight or twelve times that speed. The method of this invention also requires changes in tracking servo gain, as will become apparent presently.

With continued reference to FIG. 2 the outputs from all the photodetector sections A–D may be combined to provide a read signal representative of the data recovered from the disk 4. In the illustrated embodiment a two inputs adder 62 is provided for adding together the outputs from the two adders 40 and 41 of the tracking servo circuit 18. The read signal thus obtained is sent over a line 63 to the wave shaping circuit 9, FIG. 1. It is self evident that the adder 62 could be connected to the outputs of the adders 51 and 52 of the focusing servo circuit 18, or a four inputs adder could be employed for direct connection to the four photodetector sections. All or some of the adders 40, 41, 51, 52 and 62 and subtracters 42 and 53 could be parts of the transducer 6.

With reference back to FIG. 1 the transducer 6 is moved radially of the disk 4 by the feed means 7 typically comprising an electric motor and means such as a lead screw or a rack and pinion mechanism for translating the bidirectional rotation of the motor into the linear reciprocation of the transducer 6. The feed means 7 functions to move the transducer 6 to a desired track position across the track turns on the disk 4 in response to a seek command sent from the system controller 14 over a line 64. Additionally, the feed means 7 includes a low pass filter for deriving from the tracking signal fed from the tracking servo circuit 17 over a line 65, the signal component indicative of the translation of the beam spot 36 radially of the disk 4. The feed means 7 thus enables the transducer 6 to trace the spiral track 21 in cooperation with the disk drive motor 5.

The wave shaping circuit 9 amplifies the radio frequency read signal from the transducer 6 and reshapes it into a binary signal. It is understood that the disk 4 carries data encoded by the well known eight to fourteen modulation (EFM) method. The output from the wave shaping circuit 9 is therefore an EFM signal if the data is correctly retrieved from the disk.

In this particular embodiment of the invention the wave shaping circuit 9 performs the additional function of enabling the system controller 14 to ascertain whether the tracking servo is locked or, due to some physical defect of the disk, unlocked. Toward this end the wave shaping circuit 9 has its output connected to the system controller 14 by way of a line 66.

By the term "locked" as used in the preceding paragraph is meant that the tracking servo is functioning properly, with the beam spot maintained more or less in alignment with the disk track. The term "unlocked" means then that the beam spot has accidentally deviated radially of the disk out of tracking servo control. The beam spot will traverse some track turns in the event of tracking servo unlocking, so that the output from the wave shaping circuit 9 will then contain a pulse each time the beam spot traverses a track turn, the beam being then modulated by the track. Tracking failures, or tracking servo unlockings, are detectable by counting these wave shaping circuit output pulses during each pre-assigned length of time and comparing the count with a prescribed number, as will be detailed later in the course of the discussion of the inventive method.

The wave shaping circuit 9 has its output connected to both synchronization detector and demodulator circuit 10 and phase locked loop (PLL) circuit 11. The PLL circuit 11 provides clock pulses in synchronism with the bits of the EFM signal from the wave shaping circuit 9. The clock pulses put out by the PLL circuit 11 will be hereinafter referred to as the read clock pulses. The PLL circuit 11 has another input connected by way of a line 67 to the system controller 14 whereby the central frequency of a voltage controlled oscillator, not shown, included in the PLL circuit is to be changed.

The PLL circuit 11 has its output connected to the synchronization detector and demodulator circuit 10, which operates to determine whether or not the PLL circuit is locked, that is, operating in synchronism with the EFM signal. If it is, then, the circuit 10 will pass the read clock pulses from the PLL circuit 11 on to the disk drive motor servo circuit 8 by way of a line 68. Also, when the PLL circuit 11 is found locked, the synchronization detector and demodulator circuit 10 will use the read clock pulses to demodulate the EFM signal into, for example, a digital non-return-to-zero (NRZ) signal, preparatory to delivery to the error detector and corrector circuit 12 over a line 69. The synchronization detector and demodulator circuit 10 performs the additional function of demodulating the recovered addresses of the data blocks on the disk 4, for delivery to the system controller 14 over a line 70. The system controller 14 conventionally utilizes the block addresses for causing the transducer 6 to be positioned over any desired data blocks on the disk 4.

The error detector and corrector circuit 12 detects errors, if any, in the incoming NRZ signal, corrects them if possible, and causes reading to be retried if correction is impossible. The output of the error detector and corrector circuit 12 is connected to both interface circuit 13 and system controller 14. The interface circuit 13 is connected between computer 1 and system controller 14, as well as between computer 1 and error detector and corrector circuit 12.

The variable rate clock 16 is connected to the system controller 14 by way of a bus 71, to the motor servo circuit 8 by way of a line 72, and to the error detector and corrector circuit 12 by way of a line 109. Controlled by the system controller 14, the clock 16 generates clock pulses at either of a predetermined standard repetition rate, corresponding to the standard audio CD speed, and two, four, eight, and twelve times the standard rate, in order to meet the multiple speeds at which the motor 5 is to drive the disk 4 according to the invention. The pulses produced by the clock 16 will be referred to as the true clock pulses in contradistinction from the read clock pulses put out by the PLL circuit 11. The true clock pulses are delivered to the motor servo circuit 8 and to the error detector and corrector circuit 12 by way of the lines 72 and 109.

The motor servo circuit 8 has connected thereto the synchronization detector and demodulator circuit 10 by way of the read clock pulse line 68, the system controller 14 by way of the bus 71 and a CAV/CLV control line 75, the clock 16 by way of the line 72, and a motor speed sensor 73 by way of a line 74. The output line 76 of the motor servo circuit 8 is connected to the disk drive motor 5.

Mechanically coupled to the disk drive motor 5, the motor speed sensor 73 generates pulses at a rate proportional to the rotational speed of the motor and hence of the disk 4. Six motor speed pulses are generated with each complete revolution of the motor in this particular embodiment. Besides being connected to the motor servo circuit 8, the motor speed sensor 73 is coupled to the system controller 14 by way of the line 74 in order to enable the same to know the rotational speed of the disk in real time, as well as to detect each complete revolution of the disk.

FIG. 1 further indicates that the system controller 14 is connected by way of a line 94 to the output line 63 of the transducer 6. In the method of this invention the system controller 14 relies on the transducer output for determining if the beam spot is kept more or less focused on the disk surface under the control of the focusing servo or, because of some physical defect of the disk, totally unfocused beyond the servo control. As has been set forth in connection with the tracking servo, the focusing servo is "locked" when the beam spot is held more or less focused on the track carrying surface of the disk under its control, and "unlocked" when the beam spot is unfocused out of focusing servo control.

Figure 3:
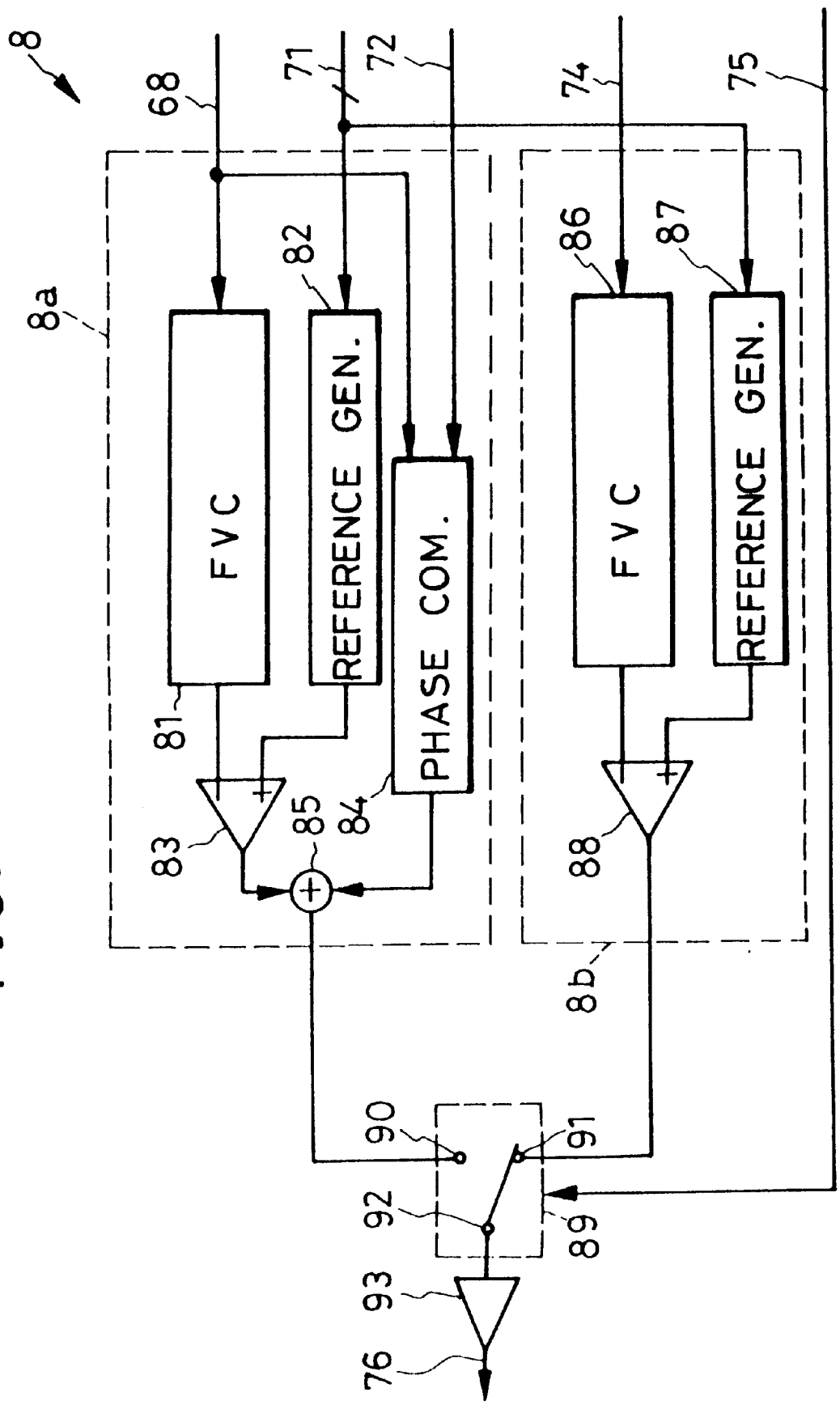
FIG. 3 is a schematic electrical diagram showing in more detail the disk drive motor servo circuit included in the FIG. 1 CD-ROM drive.

As illustrated in detail in FIG. 3, the motor servo circuit 8 comprises a CLV servo circuit 8a for CLV control of the disk drive motor 5, and a CAV servo circuit 8b for CAV control of that motor. The CLV servo circuit 8a includes a frequency to voltage converter (FVC) 81 having an input connected to the read clock pulse line 68 for converting the repetition rate of the read clock pulses into an equivalent voltage signal. The output of the FVC 81 is connected to one input of a differential amplifier 83.

Connected to another input of the differential amplifier 83 is a 20 reference voltage generator 82 which puts out a selected one of five different reference voltages corresponding to a predetermined minimum disk rotation speed, which in this particular embodiment is the standard audio CD speed, and two, four, eight, and twelve times the minimum speed, in response to the speed data sent from the system controller 14 by way of the bus 71. Thus the differential amplifier 83 puts out a voltage signal indicative of the difference between the selected reference voltage and the FVC output voltage representative of the read clock pulse rate.

A further member of the CLV servo circuit 8a is a phase comparator 84 having an input connected to the read clock pulse line 68, and another input to the true clock pulse line 72. The output from the phase comparator 84 is therefore indicative of the phase departure of the read clock pulses from the true clock pulses.

The differential amplifier 83 and the phase comparator 84 are both connected to an adder 85, an additional component of the CLV circuit 8a The output from the adder 85 is the sum of the repetition rate error signal from the differential amplifier 83 and the phase error signal from the phase comparator 84. This output from the adder 66 is therefore termed a total error signal.

The CAV servo circuit 8b likewise comprises an PVC 86 and a reference voltage generator 87, both connected to the inputs of a differential amplifier 88. Connected to the output line 74 of the motor speed sensor 73, the FVC 86 provides a voltage proportional to the repetition rate of the motor speed pulses, that if, to the rotational speed of the disk drive motor 5. Like its counterpart in the CLV servo circuit 8a, the reference voltage generator 87 has its input connected to the speed data bus 71 for putting out a reference voltage corresponding to the speed specified by the system controller 14. The differential amplifier 88 provides a voltage proportional to the difference between the outputs from the FVC 86 and the reference voltage generator 87.

The motor servo circuit 8 is further provided with a selector switch 89 for selectively putting out the CLV and the CAV control signals produced by the circuits 8a and 8b. The selector switch 89 is shown to comprise a fixed contact 90 connected to the adder 85 of the CLV servo circuit 8a, another fixed contact 91 connected to the differential amplifier 88 of the CAV servo circuit 8b, and a movable contact 92 connected to a drive amplifier 93 and thence to the disk drive motor 5, FIG. 1, by way of the line 76. The movable contact 92 is engageable with either of the two fixed contacts 90 and 91 under the direction of a CAV/CLV select signal sent from the system controller 14 over the line 75.

The FIG. 3 showing of the motor servo circuit 8 as an analog circuit is by way of example only, The motor servo circuit 8 could be digitized, either in part or in whole.

The system controller 14, FIG. 1, can take the form of a microprocessor of conventional design comprising a central processor unit (CPU) 81 and a random access memory. An external ROM 15 is shown connected to the controller 14. The ROM 15 may be factory preprogrammed to enable the controller 14 to perform various operations automatically. The programs on the ROM 15 include a disk check program according to the present invention, which dictates a sequence of steps to be followed for determining a speed of rotation suiting each loaded disk according to its physical quality as detected from the performances of the tracking and focusing servos at various disk speeds and at various gains of these servos.

Figure 4:
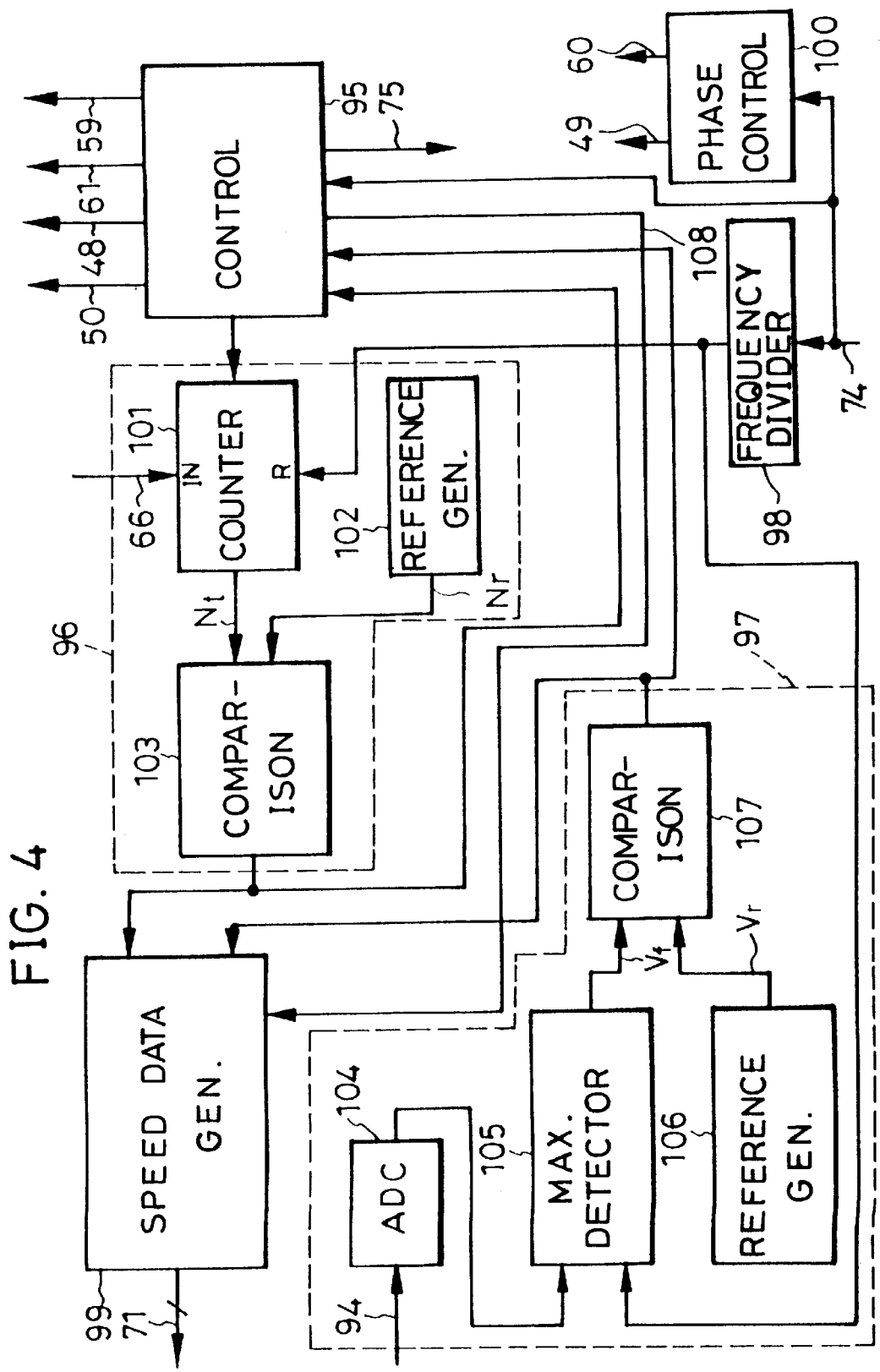
FIG. 4 is an equivalent block diagram of the system controller included in the FIG. 1 CD-ROM drive, particularly in regard to the implementation of the disk check method according to the present invention.

Block diagrammatically illustrated in FIG. 4 are some of the means that may be considered equivalently included in the system controller 14 for performing the disk check program according to the invention. A control means 95 generates various signals for setting the CD-ROM drive 2 in either disk check mode or read mode, and for various other control functions hereinafter made apparent. For disk check mode the control means 95 will supply signals over a line 108 for indicating speeds of disk rotation, over the line 48 for closing the tracking servo switch 43, FIG. 2, over the line 59 for closing the focusing servo switch 54, and over the lines 50 and 61 for activating the gain select means 46 and 57. For read mode, too, the control means 95 will send signals for closing the tracking servo switch 43 and focusing servo switch 54. The control means 95 will also provide a signal for connecting the movable contact 92, FIG. 3, of the selector switch 89 to the first fixed contact 90 for CLV driving of the disk drive motor 5, and to the second fixed contact 91 for CAV driving. The output line 74 of the motor speed sensor 73, FIG. 1, is connected to the control means 95 in order to enable the same to form the signal to be applied to the selector switch 89.

A tracking failure detection means 96 functions to ascertain whether the beam spot is held more or less aligned on the disk track under tracking servo control or has deviated radially of the disk out of tracking servo control, that is, whether the tracking servo is locked or unlocked. The tracking failure detection means 96 comprises a counter 101, a reference generating means 102, and a comparison means 103. Reset by each output pulse from a frequency divider 98 connected to the output line 74 of the motor speed sensor 73, FIG. 1, the counter 101 counts the output pulses of the wave shaping circuit 9. The frequency divider 98 divides the repetition frequency of the motor speed pulses into one sixth in this particular embodiment. Since the motor speed sensor 73 produces six pulses during each complete revolution of the disk drive motor 5, as has been stated, the frequency divider 98 puts out a pulse with each complete disk revolution. Thus the counter 101 counts the pulses produced by the wave shaping circuit 9 during each complete disk revolution.

On being loaded into the CD-ROM drive 2, each disk is checked as to its quality at one or more speeds by the method of this invention. Both tracking servo switch 43 and focusing servo switch 54 are closed at each such speed in order to determine the disk quality from the performances of the tracking and focusing servos. The wave shaping circuit 9 will therefore put out a large number of pulses during each disk revolution as the read beam is modulated by the disk pits, provided, of course, that both tracking and focusing servos are locked. Contrastingly, in event the tracking servo is unlocked, with the beam irrecoverably deviating out of tracking servo control, the wave shaping circuit 9 will produce a pulse only each time the beam traverses a track turn. Whether the tracking servo is locked or unlocked can therefore be determined from the number of pulses produced by the wave shaping circuit 6, or by the transducer 6, per unit length of time.

To that end the comparison means 103 of the tracking failure detection means 96 compares the variable pulse number $N_t$ from the counter 101 and a predetermined reference pulse number $N_r$ from the reference generating means 102. The reference number $N_r$ is less than the expected minimum number of read pulses to be obtained during each complete revolution of the disk during the normal reading of the disk and more than the expected maximum number of transducer output pulses to be obtained during each complete disk revolution when the tracking servo is unlocked. The comparison means 103 will produce a signal indicative of a tracking failure when the variable number $N_t$ becomes less than the reference number $N_r$. This output from the comparison means 103 is directed into both control means 95 and speed data generating means 99 thereby to be used for determination of the speed at which each loaded disk is to be read.

Another important component of the FIG. 4 circuitry is a focusing failure detection means 97 which determines whether the beam is more or less focused on the disk surface under focusing servo control or is unfocused beyond focusing servo control, that is, whether the focusing servo is locked or unlocked. The focusing servo is unlocked when the distance between disk 4 and objective lens 26 goes out of a predetermined range in which the focusing servo is capable of functioning. Since the output from the transducer 6 will inordinately decrease in magnitude in the event of an irrecoverable focusing failure, this trouble is detectable on the basis of the magnitude of the transducer output.

Toward that end the detection means 97 comprises an analog to digital converter (ADC) 104, a maximum detection means 105, a reference generating means 106, and a comparison means 107. Connected to the transducer 6 by way of the line 94, the ADC 104 digitizes the analog output from the transducer. The maximum detection means 105 has an input connected to the ADC 104 and another to the frequency divider 98 for detecting the maximum value $V_f$ of the ADC output during each complete revolution of the disk 4. The reference generating means 106 provides a reference value $V_r$ which corresponds to the minimum of the transducer output voltage when the focusing servo is locked.

Comparing the two inputs $V_f$ and $V_r$ the comparison means 107 will provide a signal indicative of a focusing failure when the maximum value $V_f$ is less than the reference value $V_r$. Like the output from the tracking failure detection means 96, this output from the focusing failure detection means 97 is directed into both control means 95 and speed data generating means 99 thereby to be used for determination of the speed at which each loaded disk is to be read.

FIG. 4 also shows a phase control means 100 as part of the system controller 14. The phase control means 100 detects the actual speed of rotation of the disk drive motor 5 on the basis of the motor speed pulses supplied over the line 74. The detected motor speed is utilized for producing signals that are applied over the lines 49 and 60 to the phase compensator circuits 44 and 55, FIG. 2, for changing their filter constants according to the motor speed.

Figure 5:
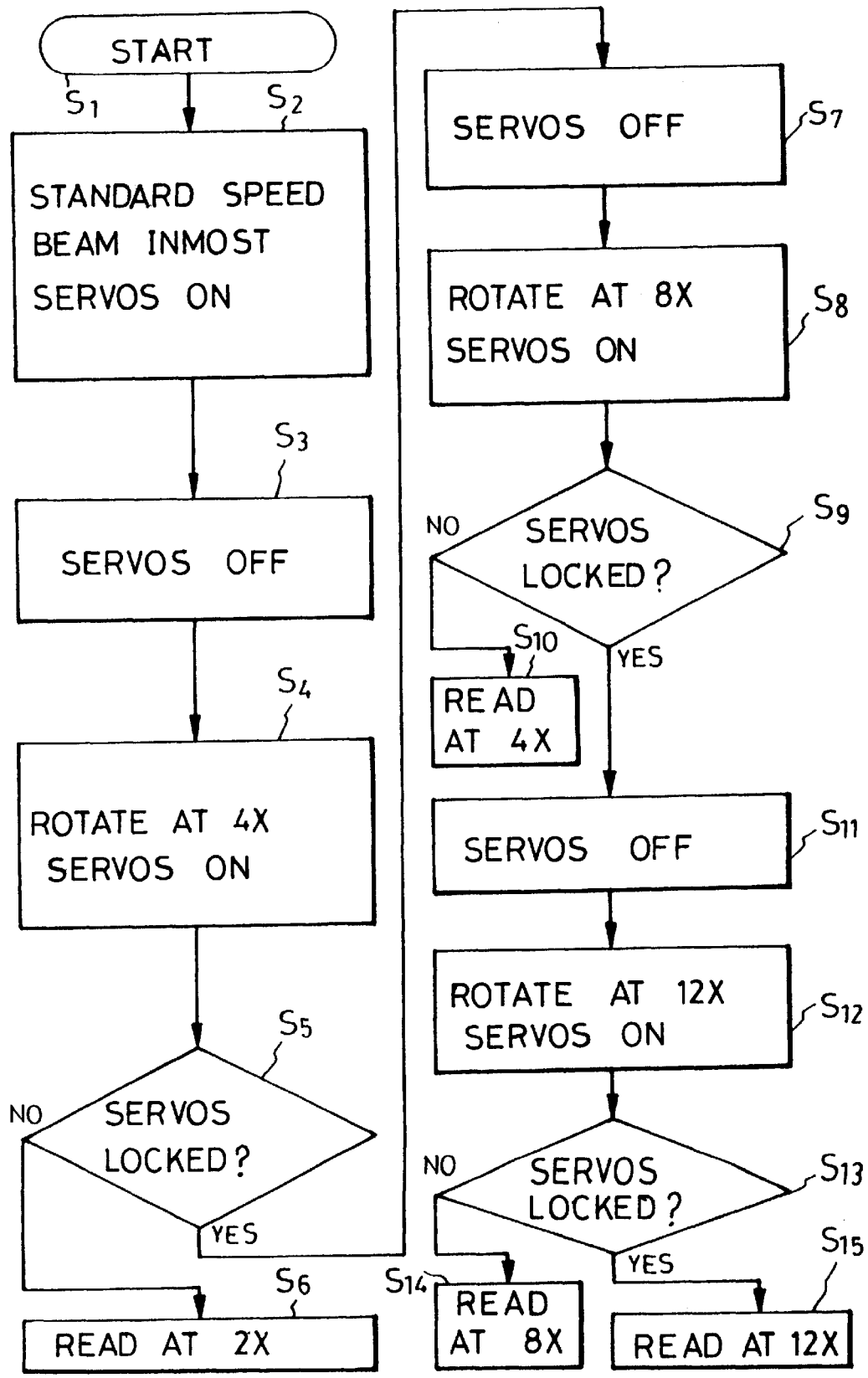
FIG. 5 is a flow chart of the disk check method according to the present invention to be practiced in the FIG. 1 CD-ROM drive.

Reference is now directed to the flowchart of FIG. 5 for a discussion of the disk check program stored on the ROM 15 according to the method of the present invention. The disk check program is to be invoked automatically each time a disk is loaded on the drive motor spindle 19. This particular program is designed to classify each disk into either of four categories, poor, below-average, above-average, and good, according to its quality and to read the disk at the matching one of two, four, eight, and twelve times the standard audio CD speed.

Following the start of the program at $S_1$, the disk is driven at the standard audio CD speed, and the beam spot 36 is positioned on the radially inmost turn of the track 21 on the disk 4, both as set forth at a block $S_2$. Further, according to this same block, both tracking and focusing servos are set into operation by closing the switch 43 and 54, in order to read the prerecorded table of contents from the disk. The reading of the table of contents according to this block is intended to make sure that the loaded disk is a CD-ROM. After the disk has proved to be so, both tracking and focusing servos are temporarily cut off at a block $S_3$ by way of preparation for a rise in disk speed which is to follow.

The next block $S_4$ dictates the driving of the disk at four times the standard audio CD speed. The control means 95, FIG. 4, of the system controller 14 will put out various disk check mode signals toward this end. Such signals include one sent over the line 75 to the selector switch 89, FIG. 3, for connecting the CAV servo circuit 8b to the disk drive motor 5, and another sent over the line 108 for causing the speed data generating means 99 to supply data indicative of four times the standard audio CD speed to the reference voltage generator 87 of the CAV servo circuit 8b. The disk is now conditioned for rotation at the required speed. The control means 95 will also deliver gain control signals over the lines 50 and 61 to the gain select means 46 and 57, FIG. 2, for setting the tracking and focusing servo gains at values suiting the presently required disk speed of four times the standard audio CD speed. It is understood that the beam spot is still maintained on the radially inmost track turn on the disk.

After the disk has gained the required speed, both tracking servo switch 43 and focusing servo switch 54 may be reclosed according to the same block $S_4$. The tracking servo will then start operation to hold the beam spot on the disk track, and the focusing servo to hold the beam focused on the disk surface.

Then comes a logical node $S_5$ which asks if both tracking and focusing servos are locked. The tracking and the focusing failure detection means 96 and 97, FIG. 4, of the system controller 66 will operate to find an answer to this question. If either or both of the tracking and the focusing servos are found unlocked, this disk is of poor quality and so is readable only at two times the standard audio CD speed, as indicated at a block $S_6$. For reading at this speed, the control means 95, FIG. 4, of the system controller 14 will cause the speed data generating means 99 to put out data indicative of that speed. The control means 95 will also send gain control signals over the lines 50 and 61 for readjusting the tracking and the focusing servo gains to the required read speed.

The poor quality disk will thus be read at the constant linear velocity of two times the standard audio CD speed. The fact that either or both of the tracking and the focusing servos is unlocked during disk rotation at four times the standard audio CD speed will be held on the RAM included in the system controller 14 until the disk is unloaded. This disk will therefore be read at the same reduced speed no matter how many times it is accessed, as long as it stays loaded on the drive spindle 19.

This program does not recheck the disk quality at two times the standard audio CD speed. Such rechecking is considered unpractical because, as has proved by experiment, the tracking and the focusing servos seldom unlock at this low speed, now matter how poor the disk quality may be.

If the tracking and the focusing servos are both found locked at the node $S_5$, on the other hand, then both servos are again temporarily cut off at a block $S_7$, preparatory to increasing the disk speed to eight times the standard audio CD speed according to a block $S_8$. Both servos are turned on after the disk has gained the required speed. An increase in disk speed from four to eight times the standard audio CD speed can be accomplished through the same procedure as set forth above in connection with the block $S_4$ for the speed increase to four times the standard speed.

The disk quality is then rechecked according to a node $S_9$. If at lest either of the tracking and the focusing servos is found unlocked, this disk is of below-average quality, fit for reading at four times the standard audio CD speed, as indicated at a block $S_{10}$. This result is stored on the RAM of the system controller 14, and the disk speed is lowered from eight to four times the standard audio CD speed for reading.

If the tracking and the focusing servos are both found locked at the node $S_9$, on the other hand, then the disk speed is increased from eight to twelve times the standard audio CD speed according to a block $S_{12}$, after cutting off both servos according to a block $S_{11}$. Both servos are set into operation again after the disk has acquired the desired speed.

Then comes still another node $S_{13}$ which again asks whether both servos are locked. If either or both of the servos are found unlocked, the disk is of above-average quality. The disk speed is therefore reduced from twelve to eight times the standard audio CD speed for reading, according to a block $S_{14}$. The unlocking of either or both of the servos at twelve times the standard audio CD speed is held on the RAM of the system controller 14 until the disk is withdrawn from the disk drive, in order to read the disk at the same safe speed as long as it stays within the device.

If, on the other hand, the tracking and the focusing servos are still found locked at the node $S_{13}$, the disk is of good quality and so is read at the maximum speed of 12 times the standard audio CD speed, as indicated at a block $S_{15}$. The fact that both servos remained locked at twelve times the standard audio CD speed is also held on the RAM until the disk is unloaded.

Figure 6:
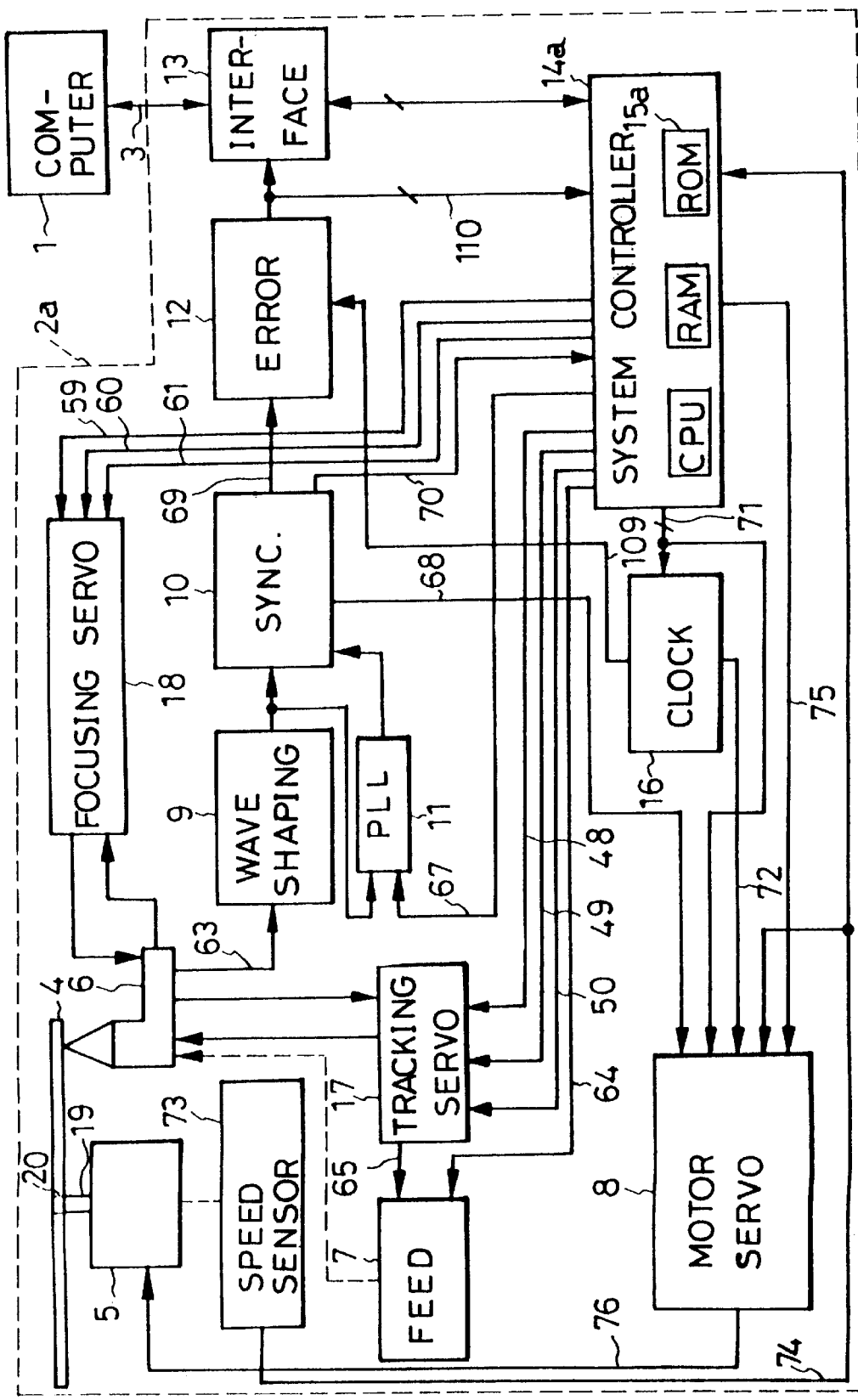
FIG. 6 is a block diagram similar to FIG. 1 but showing another example of CD-ROM drive according to the present invention.
Figure 7:
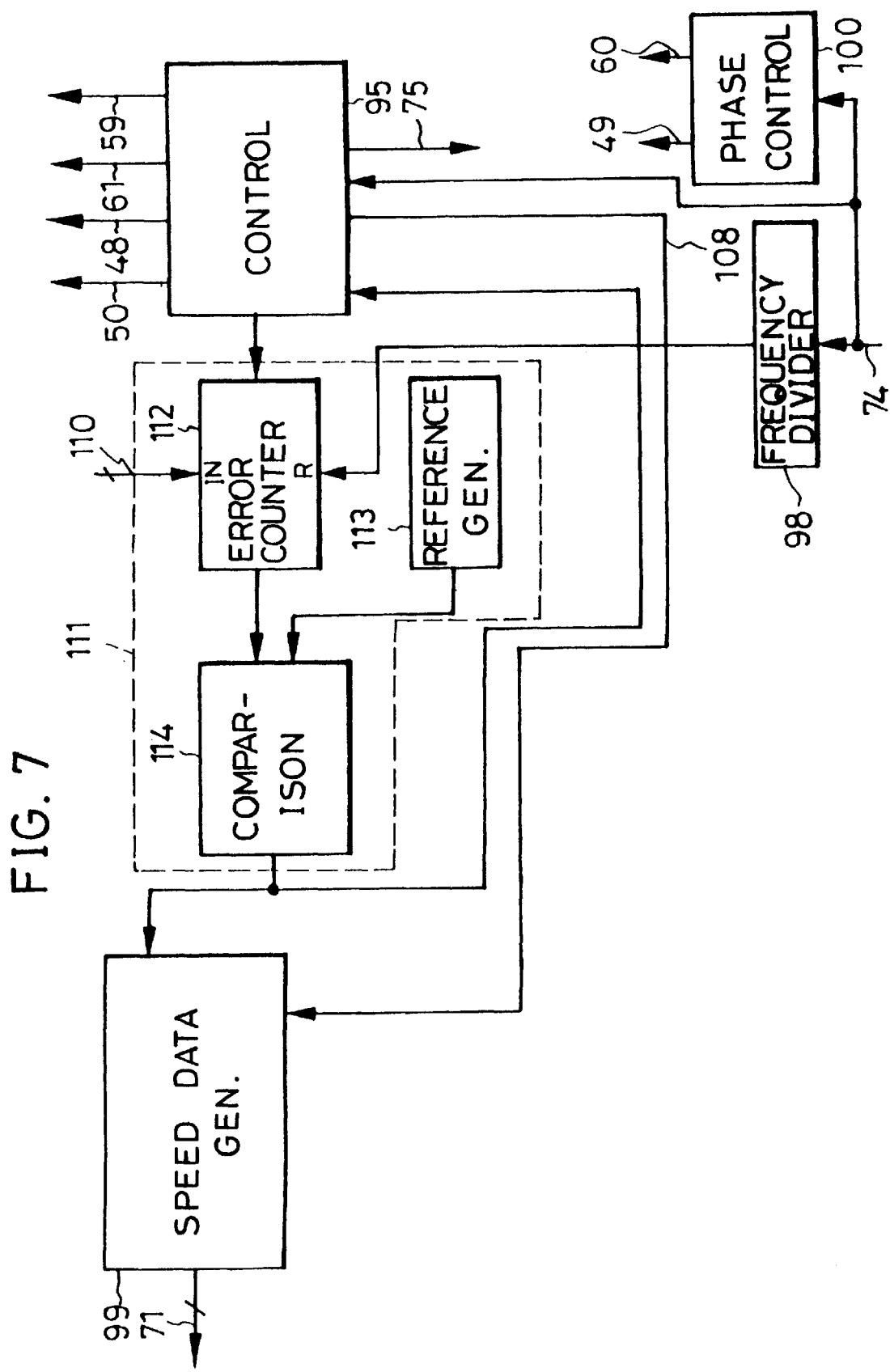
FIG. 7 is a block diagram similar to FIG. 4 but showing the system controller of the FIG. 6 CD-ROM drive, particularly in regard to a modified disk check method suitable for implementation in the FIG. 6 CD-ROM drive.
Figure 8:
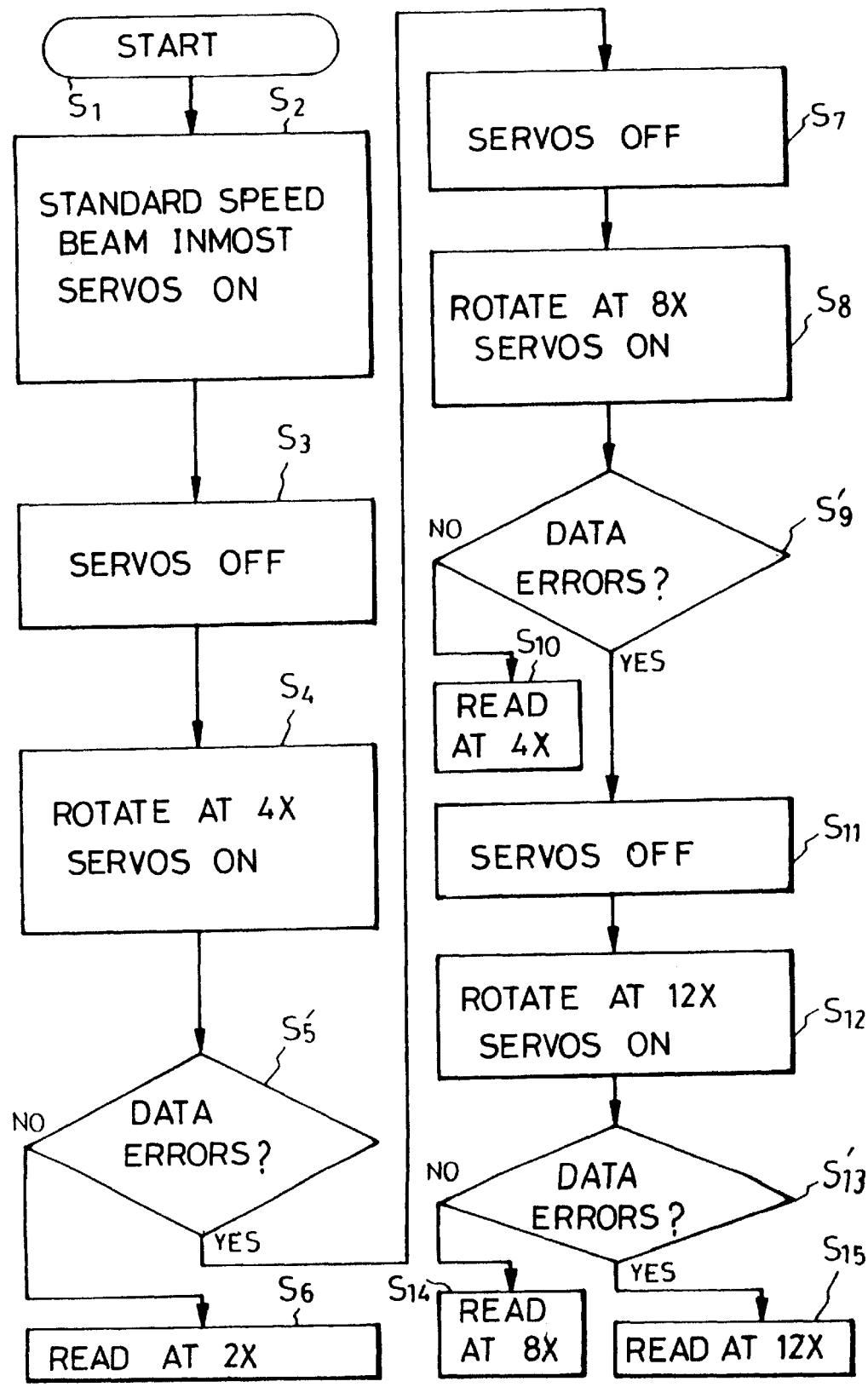
FIG. 8 is a flow chart of the modified disk check method according to the present invention.

Disk quality was evaluated in the foregoing embodiment from the performances of the tracking and the focusing servos at several prescribed disk speeds. In the following embodiment, then, which is illustrated in FIGS. 6–8, the same purpose is accomplished by counting read errors taking place during a prescribed length of time. However, since the frequency of read errors depends upon whether the tracking and the focusing errors are locked or unlocked, it can also be stated that in this alternative embodiment, whether the servos are locked or unlocked is determined in terms of the frequency of read errors, instead of in terms of the number of transducer output pulses during each complete revolution of the disk and the magnitude of the transducer output during each complete disk revolution.

A comparison of the FIG. 6 CD-ROM drive 2a with that of FIG. 1 will reveal that the former does not have the lines 66 and 94 for ascertaining whether the tracking and the focusing servos are locked or unlocked. Detection of errors in recovered data is conventionally performed by the error detector and corrector circuit 12, and signals indicative of read errors are sent from this circuit to a system controller 14a over a bus 110. Shown to be built into the system controller 14a, a ROM 15a is factory preprogrammed according to the alternative disk check method of this invention.

As illustrated in FIG. 7, the system controller 14a is configured to include a read error detection means 111 in lieu of the tracking failure detection means 96 and focusing failure detection means 97 of the FIG. 4 system controller 14. The error detection means 111 includes a counter 112 having an input terminal connected to the error detector and corrector circuit 12 by way of the but 110, and a reset terminal connected to the motor speed sensor 73 via the frequency divider 98. Therefore, reset by each frequency divider output pulse, the counter 112 counts read errors taking place during each complete revolution of the disk. The transducer 6 retrieves the address data and other information in the table of contents on the radially inmost track turn on the disk during disk check operations. The counter 112 counts errors that have occurred in reading that track turn.

The output from the counter 112 is directed to one input of a comparison means 114, to another input of which is supplied a reference number from its generating means 113. The reference number is a minimum number of errors that will normally occur during each complete disk revolution. A typical reference number is zero. Thus the comparison means 114 compares the number of errors that have actually occurred during disk rotation at either of four, eight, and twelve times the standard audio CD speed, with the reference number.

If the actual number of errors is not more than the reference number, it means that both tracking and focusing servos are locked, and that the disk is readable at the current speed. Both or either of the servos may be unlocked if the actual error number exceeds the reference number, so that the current speed is too high for the disk. The output from the comparison means 114 is directed into both speed data generating means 99 and control means 95.

This CD-ROM drive 2a is similar to the FIG. 1 device 2 in all the other details of construction.

As flowcharted in FIG. 8, the alternative disk check method differs from the FIG. 5 method only at nodes $S_5'$, $S_9'$ and $S_{13}'$. The first node $S_5'$ asks, in essence, if any read errors have occurred at four times the standard audio CD speed. The disk in question is read at two times the standard audio CD speed if they have, and at a higher speed if they have not. The second node $S_9'$ asks if any read errors have occurred at eight times the standard audio CD speed. The disk is read at four times the standard audio CD speed if they have, and at a higher speed if they have not. The third node $S_{13}'$ asks if any read errors have occurred at twelve times the standard audio CD speed. The disk is read at eight times the standard audio CD speed if they have, and at twelve times the standard audio CD speed if they have not.

The evaluation of disk quality on the basis of read errors is essentially equivalent to that on the basis of whether the tracking and the focusing servos are locked or unlocked, because read errors, at least as detected in the method of this invention set forth above, are a measure of whether the servos are locked or unlocked. This alternative method therefore gains the same advantages as does the first disclosed method, and possesses the advantage thereover that it requires only the error detection means 111, FIG. 7, in place of the tracking failure detection means 96, FIG. 4, and focusing failure detection means 97.

Notwithstanding the foregoing detailed disclosure it is not desired that the present invention be limited by the exact showing of the drawings or the description thereof; rather, the invention should be construed broadly and in a manner consistent with the fair meaning or proper scope of the attached claims. The following is a brief list of possible modifications of the illustrated embodiment which are all believed to fall within the scope of the invention:

1. The quality of the loaded disk could be checked in terms of only either of the tracking and focusing servos, instead of both as in the illustrated embodiment.

2. Either or both of the tracking failure detection means 96 and focusing failure detection means 97, FIG. 4, could be external to the controller 14.

3. The servo gain select means 46 and 57, FIG. 2, could be provided on other than the drive amplifiers 45 and 56.

4. The CAV servo circuit 8b, FIG. 3, could be omitted.

5. The photodetector could be split into two sections instead of four as in the illustrated embodiment.

6. The invention could be applied to devices for CAV servo reading of CAV disks, CAV reading of CLV disks, and combined CAV and CLV reading of CLV disks.

What is claimed is:

1. In an apparatus for data recovery from rotating data storage disks of varying physical qualities, the apparatus having a transducer for reading a disk by irradiating the same with a beam of light, a tracking servo for holding the beam spot in alignment with a data track on the disk surface, and a focusing servo for holding the beam focused on the disk surface, a method comprising the steps of:

(a) rotating a data storage disk at a first predetermined speed preparatory to data recovery therefrom;

(b) ascertaining whether at least either of the tracking servo and the focusing servo is locked or unlocked while the disk is rotating at the first predetermined speed; and (c) reading the disk at a second predetermined speed, which is less than the first predetermined speed, if said at least either of the tracking servo and the focusing servo is found unlocked at step (b).

2. The method of claim 1 wherein the disk has data recorded thereon in the form of pits along the data track, and wherein whether the tracking servo is locked or unlocked is ascertained in terms of a number of pulses produced per unit length of time by the transducer on reading the pits in the disk.

3. The method of claim 1 wherein whether the focusing servo is locked or unlocked is ascertained in terms of the magnitude of an output from the transducer during each preassigned length of time.

4. The method of claim 1 wherein whether said at least either of the tracking servo and the focusing servo is locked or unlocked is ascertained in terms of a number of data errors taking place during each preassigned length of time.

5. The method of claim 1 wherein the findings as to whether said at least either of the tracking servo and the focusing servo is locked or unlocked is held until the disk is withdrawn from the apparatus.

6. In an apparatus for data recovery from rotating data storage disks of varying physical qualities, the apparatus having a transducer for reading a disk by irradiating the same with a beam of light, a tracking servo for holding the beam spot in alignment with a data track on the disk surface, and a focusing servo for holding the beam focused on the disk surface, a method comprising the steps of:

(a) rotating a data storage disk at a first predetermined speed, with both tracking servo and focusing servo in operation, preparatory to data recovery therefrom;

(b) ascertaining whether said at least either of the tracking servo and the focusing servo is locked or unlocked while the disk is in rotation at the first predetermined speed;

(c) reading the disk at a second predetermined speed, which is less than the first predetermined speed, if said at least either of the tracking servo and the focusing servo is found unlocked at step (b);

(d) instead of step (c), rotating the disk at a third predetermined speed, which is higher than the first predetermined speed, with both tracking servo and focusing servo in operation, if said at least either of the tracking servo and the focusing servo is found locked at step (b);

(e) ascertaining whether said at least either of the tracking servo and the focusing servo is locked or unlocked while the disk is in rotation at the third predetermined speed;

(f) reading the disk at the first predetermined speed if said at least either of the tracking servo and the focusing servo is found unlocked at step (e); and (g) reading the disk at a fourth predetermined speed, which is not less than third predetermined speed, if said at least either of the tracking servo and the focusing servo is found locked at step (e).

7. An apparatus for data recovery from rotating data storage disks of varying physical qualities, each disk having data prerecorded thereon along a multiturn track, wherein the improvement resides in the combination of:

(a) drive means including a drive motor for imparting multiple speed rotation to a data storage disk;

(b) a transducer for reading the disk by irradiating the same with a beam of light;

(c) tracking servo means for holding the beam aligned with the track on disk;

(d) focusing servo means for holding the beam focused on the disk;

(e) speed data generating means connected to the drive means for causing the same to rotate the disk at either of a first, a second, and a third predetermined speed;

(f) failure detecting means for detecting whether at least either of the tracking servo means and the focusing servo means is locked or unlocked; and (g) control means connected to all of the tracking servo means and the focusing servo means and the speed data generating means and the failure detecting means for causing a data storage disk to be rotated at the first predetermined speed, with both tracking servo and focusing servo in operation, preparatory to data recovery therefrom, for causing the disk to be read at the second predetermined speed, which is less than the first predetermined speed, if said at least either of the tracking servo and the focusing servo is found unlocked by the failure detecting means while the disk is in rotation at the first predetermined speed, and for causing the disk to be read at the third predetermined speed, which is not less than the first predetermined speed, if said at least either of the tracking servo and the focusing servo is found locked by the failure detecting means while the disk is in rotation at the first predetermined speed.

8. The apparatus of claim 7 wherein the failure detecting means is a tracking failure detecting means comprising:

(a) a counter for counting pulses produced by the transducer per unit length of time;

(b) reference generating means for generating a signal indicative of a prescribed reference number which is less than an expected minimum number of pulses to be produced by the transducer during each unit length of time when the tracking servo means is locked and more than an expected maximum number of pulses to be produced by the transducer during each unit length of time when the tracking servo is unlocked; and (c) comparison means for comparing the count of the counter with the reference number.

9. The apparatus of claim 8 further comprising:

(a) a motor speed sensor coupled to the drive motor for producing a signal indicative of the speed of rotation thereof; and (b) a frequency divider connected between the motor speed sensor and the counter for causing the latter to count the pulses produced by the transducer during each complete revolution of the motor.

10. The apparatus of claim 7 wherein the failure detecting means is a focusing failure detecting means comprising:

(a) maximum detection means connected to the transducer for detecting a maximum value of the output therefrom during each predetermined period of time;

(b) reference generating means for providing a signal indicative of a reference value which corresponds to an expected minimum value of the transducer output when the focusing servo means is locked; and (c) comparison means for comparing the maximum value of the transducer output with the reference value.

11. The apparatus of claim 10 further comprising:

(a) a motor speed sensor coupled to the drive motor for producing a signal indicative of the speed of rotation thereof; and (b) a frequency divider connected between the motor speed sensor and the maximum detection means for causing the latter to detect the maximum value of the transducer output during each complete revolution of the motor.

12. The apparatus of claim 7 wherein the apparatus further comprises an error detector and corrector circuit for detecting and, if possible, correcting read errors, and wherein the failure detecting means is a read error detection means comprising:

(a) a counter connected to the error detector and corrector circuit for counting read errors thereby detected during a predetermined period of time;

(b) reference generating means for providing a signal indicative of a reference number which is an expected minimum number of read errors that will occur during the predetermined period of time when the tracking servo means and the focusing servo means are locked; and (c) comparison means for comparing the count of the counter with the reference number.

13. The apparatus of claim 12 further comprising:

(a) a motor speed sensor coupled to the drive motor for producing a signal indicative of the speed of rotation thereof; and (b) a frequency divider connected between the motor speed sensor and the counter for causing the latter to count read errors during each complete revolution of the motor.

14. The apparatus of claim 7 further comprising means for holding the findings as to whether said at least either of the tracking servo means and the focusing servo means is locked or unlocked, until the disk is withdrawn from the apparatus.

* * * * *